Patented Dec. 16, 1952

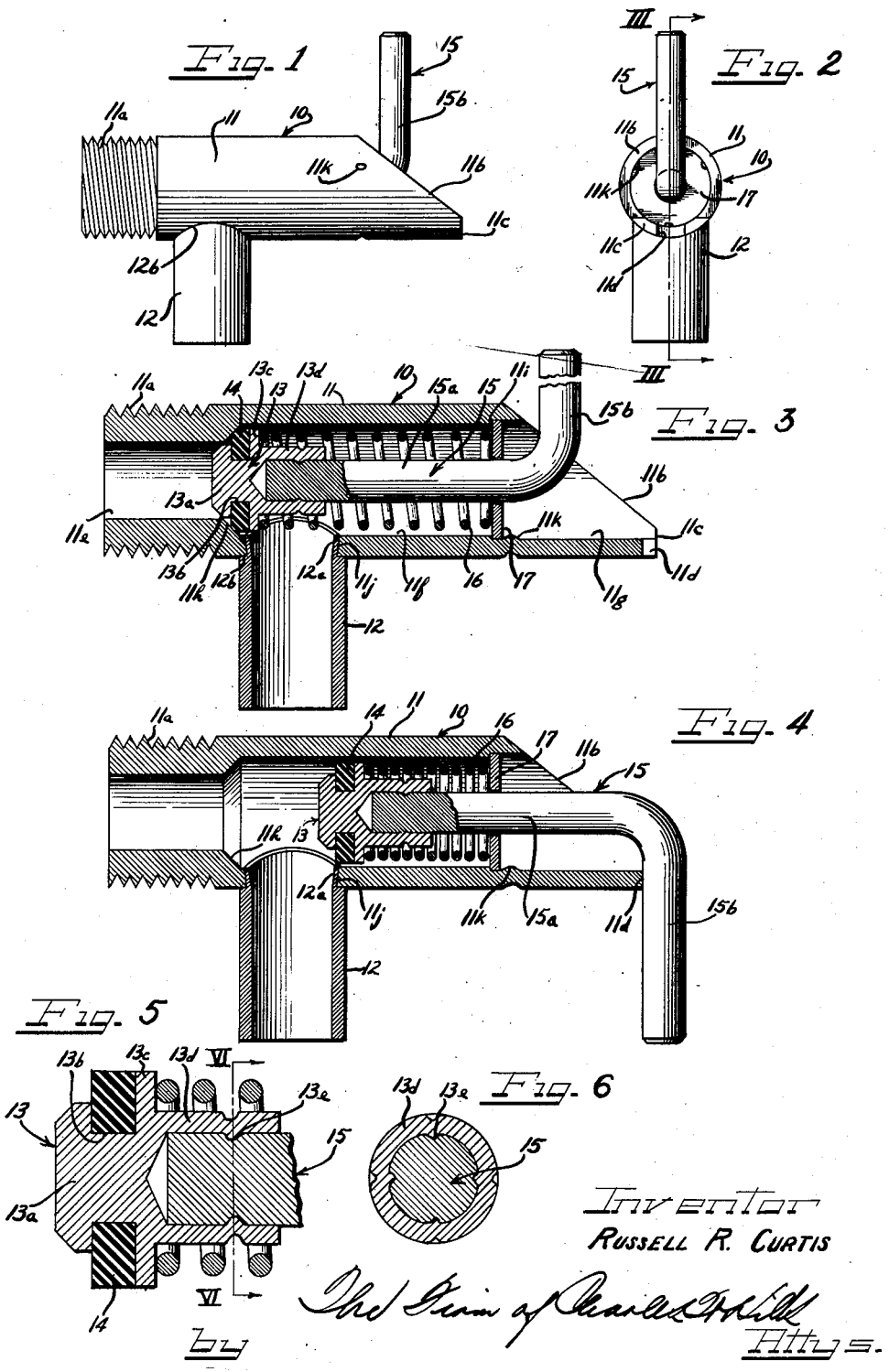

2,621,677

UNITED STATES PATENT OFFICE 2,621,677

VALVE

Russell R. Curtis, Dayton, Ohio, assignor to Curtis Automotive Devices, Inc., Dayton, Ohio, a corporation of Ohio Application June 2, 1947, Serial No. 751,707

3 Claims. (Cl. 137—708)

1

This invention relates to fluid flow control devices such as drain cocks or the like and specifically deals with angle flow shut off valves having a valve body portion that is readily adapted to be threaded into or otherwise secured in the drain boss of a tank, radiator, hot water heater, or the like, and having a side outlet conduit intermediate its ends together with an internal valve seat between the inlet and outlet. A spring pressed valve member carries a resilient sealing ring for coaction with said seat and is actuated by a handle which has a leg portion at its outer end coacting with an inclined end of the body to seat and unseat the valve member.

This application is a continuation in part of my copending application Serial No. 714,857 entitled: "Valve," filed December 7, 1946, and since abandoned.

A feature of this invention resides in the provision of a valve-actuating handle with a leg portion coacting against an inclined end wall on the valve housing to operate a valve between its opened and closed positions.

A further feature of this invention resides in the provision of an inexpensive side drain conduit on a valve body by merely drilling a hole in the side wall of the valve body and expanding the neck of a drain tube in this hole. The hole increases in diameter toward the inside of the valve body to provide a locking angle for the expanded neck of the drain conduit.

A further feature of the invention resides in the provision of an inexpensive valve and stem assembly composed of a pin and a rubber grommet-carrying head staked on one end of the pin.

It is, then, an object of the invention to provide an angle drain valve of the type disclosed and claimed in my abandoned copending application Serial No. 714,857, but having a less expensive housing and valve assembly.

Another object of the invention is to provide a drain valve composed of a housing having an internal valve seat and carrying a laterally extending drain tube together with a spring pressed valve assembly slidable in the housing and an operating handle secured to said assembly and riding on an end face of the housing to open and close the valve.

A further object of the invention is to provide an angle-flow drain valve having a spring-pressed valve head on an operating handle slidably guided through a housing-carried washer functioning to bottom the spring.

A still further object of the invention is to provide an angle drain valve with a drain conduit

2 expanded into the valve housing in wedge lock engagement in a tapered hole thereof.

A specific object of the invention is to provide a spring-loaded angle flow drain valve wherein a valve head carries a rubber washer for coaction with a seat in a valve housing and, in turn, is actuated by a pin having a right angle bend in the free end portion thereof for forming a leg riding on a diagonally extending end wall of the housing and seatable in a notch in this end wall to hold the valve in opened position.

Another object of the invention is to provide a drain valve actuated between opened and closed positions by riding an operating handle on an inclined end wall of the valve housing.

Other and further objects of the invention will be apparent to those skilled in the art from the following detailed description of the annexed sheet of drawings, which, by way of a preferred example only, illustrates one embodiment of the invention.

On the drawings:

Figure 1 is a side elevational view of the angle drain valve of this invention illustrating the same in closed position.

Figure 2 is a front end view of the valve of Figure 1.

Figure 3 is a longitudinal cross-sectional view taken along the line III—III of Figure 2.

Figure 4 is a view similar to Figure 3 but showing the valve in opened position.

Figure 5 is an enlarged axial cross-sectional view illustrating the manner in which the valve head is secured on the operating pin.

Figure 6 is a transverse cross sectional view taken along the line VI—VI of Figure 5.

As shown on the drawings:

The drain valve 10 shown in Figures 1 to 4 is composed of a tubular open-ended housing 11, a drain conduit 12 extending laterally from an intermediate portion of the housing 11, a valve head 13 slidably mounted in the housing and carrying a resilient rubber washer 14, a pin 15 for actuating the valve head 13, a spring 16 urging the valve head into closed position, and a metal washer 17 fixedly mounted in the housing and slidably receiving the pin 15 therethrough.

The housing 11 has an externally threaded end portion 11a for threaded insertion in the drain boss of a tank, radiator, or the like. The other end of the housing 11 has a diagonal end wall 11b extending at about a 45° angle from the side of the housing 11 opposite the side carrying the drain tube 12. The end wall 11b continues to a flat end face 11c on the same side of the housing as the drain tube 12. A fragmental cylindrical recess 11d is formed in this end face 11c and extends radially of the housing.

The housing 11 has three stepped bores 11e, 11f, and 11g therethrough with the smallest bore 11e extending through the threaded end 11a to a beveled internal valve seat 11h which diverges to the bore 11f and with the largest bore 11g being through the diagonally extending end 11b of the housing and coacting with the bore 11f to form a shoulder 11i adjacent the inner end of the diagonal end wall.

A tapered bore 11j is formed through the side wall of the housing 10 adjacent the seat 11h. This bore increases in diameter inwardly from the outer surface of the housing.

The drain tube 12 has a reduced diameter end portion 12a terminating at a shoulder 12b near one end of the tube. As shown in Figure 1, this shoulder 12b has a configuration for snugly engaging the cylindrical side wall of the housing 11. The reduced diameter portion 12a fits into the small end of the bore 11j and is expanded against the tapered wall of this bore, as shown in Figures 3 and 4, to have a wedge lock engagement with the housing 11. The expansion of the portion 12a is accomplished by means of an expansion reamer or the like. The inner edge of the portion 12a is shaped to the configuration of the bore 11f and does not project beyond the wall surface of this bore.

The valve head 13 has a solid end portion 13a with an annular groove 13b therearound receiving the sealing washer 14. A flange 13c is provided on the head to back up one entire side face of the washer 14 thereby preventing the washer from deforming axially when its opposite side face is pressed against the valve seat 11h. The flange 13c preferably has the same diameter as the washer 14 and fits freely in the bore 11f. The end of the head 13a can project into the bore 11e as shown.

A shank 13d on the head 13 has a cylindrical recess therein receiving one end of the pin 15. Staked portions 13e, best shown in Figures 5 and 6, lock the shank 13d of the head 13 on the pin against both axial and radial movement.

The pin 15 has an axially extending leg portion 15a, one end of which is locked in the head 13, slidable through the washer 17. This washer 17 is bottomed on the shoulder 11i of the housing and staked portions 11k on the housing overlie the outer face of the washer to hold it firmly against the shoulder 11i. The outer end of the pin 15 has a leg portion 15b at right angles to the portion 15a. This leg portion 15b is adapted to ride along the diagonal end wall 11b of the housing onto the flat end face 11c and thence into the recess or notch 11d.

The coil spring 16 is interposed between the washer 17 and the flange 13c of the head 13 to urge the sealing ring 14 against the seat 11h whenever the leg 15b of the pin 15 is manually moved out of the notch 11d and end wall 11c whereupon the leg will ride on the diagonal wall 11b, to permit the valve to close.

When the leg 15b of the pin 15 is turned from its upright position shown in Figures 1 to 3 to its downturned position shown in Figure 4, the rotational movement of the leg causes it to ride on the diagonal wall 11b thereby shifting the pin axially and retracting the valve head to a position for joining the bore 11e with the drain tube 12. In other words the valve is opened by retracting the sealing washer 14 off of the seat 11h. When in the fully opened position, the valve head element is moved in the bore 11f a sufficient distance away from the seat 11h so that restriction of flow will not take place. To close the valve it is merely necessary to rotate the leg 11a out of the notch 11d and off of the flat end wall 11c whereupon the spring 16 will pull the leg along the diagonal wall 11b and will seat the sealing washer 14 against the valve seat 11h.

From the above descriptions it will be clear that this invention provides a simplified inexpensive angle drain valve. The parts of the invention can be rapidly assembled by slipping the sealing ring 14 into the groove 13b of the head 13, by inserting the pin 15 into the hollow shank 13d of the head, by staking the head and pin together, by slipping the spring and washer 17 over the pin, and by inserting the assembly in the housing or body, whereupon the washer 17 is held against the shoulder 11a by staking at 11k. Of course the drain tube 12 is expanded into the tapered hole 11j of the valve housing 10 before the valve head and pin assembly are inserted in the housing.

The drain valves of this invention are adapted to be readily threaded into units to be drained and are quickly actuated from spring pressed closed position by mere rotation of the bent leg 15b of the pin to cause this leg to ride down the inclined end wall 11b.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A valve comprising a hollow open-ended body having an externally threaded end portion at one end thereof and a diagonally sloping substantially plane end portion at the other end thereof, said diagonally sloping end portion being integral with said body, the outer end of said diagonally sloping portion having a flat end face with a radially extending notch therein, said housing having an internal valve seat adjacent the threaded end portion thereof and an internal shoulder adjacent the diagonally sloping end portion thereof, a drain tube anchored in said housing between the shoulder and valve seat, said valve seat being interposed between said body threaded portion and said drain tube, a valve head slidably mounted in said housing and having an annular groove adjacent one end thereof, a sealing ring seated in said valve head groove for coacting with said seat to separate the threaded end portion of the housing from the drain tube, a washer in said housing bottomed on said shoulder, staked portions on the housing holding the washer against said shoulder, a hollow shank portion integral with said valve head and extending axially therefrom, a pin having a first leg slidably mounted through said washer and anchored in said hollow shank portion, a spring bottomed on said washer and extending in surrounding relation to said hollow shank portion and acting on said valve head for urging the sealing washer carried by the head against the valve seat on one side of said drain tube to close the valve, and a second leg on said pin bent at right angles to the first mentioned leg arranged to ride on the diagonal end wall of the housing onto said flat end face and into said notch for opening the valve, whereupon said valve is opened by rotating the second leg against the diagonal end wall to axially retract the first leg through the washer thereby drawing the sealing washer away from its seat toward said shoulder to the opposite side of said drain tube, thus completely removing the valve head from its interposed position between said drain line and said valve seat to accommodate free communication therebetween, and said valve is closed by merely removing said second leg from said notch and allowing the spring to carry said valve head toward said seat with said second pin leg riding along said plane sloping end portion of the body.

2. A drain valve comprising a hollow open-ended body having three stepped bores therethrough, a threaded end on said body around the smallest bore thereof, a diagonally inclined opposite end on the body, said inclined opposite end being integral with said body, a valve seat connecting said smallest bore and the intermediate bore, a shoulder connecting the intermediate bore and the largest bore, a hole in the side wall of said body between said valve seat and said shoulder and adjacent said valve seat, said hole increasing in diameter inwardly from the outer surface of the body, a drain tube having a reduced diameter exterior portion expanded into said hole and a shoulder at the end of said reduced diameter portion shaped to snugly engage the outer surface of the body, said tube having a substantially uniform inside diameter, a washer bottomed against said shoulder, localized deformed portions on said housing anchoring said washer against said shoulder, a valve head slidable in the intermediate bore in said body and having an annular groove formed therein adjacent one end, a resilient ring seated in said valve head groove for coacting with said seat to separate the small bore from the drain tube, said ring extending into closely spaced relation with the interior surfaces of said interior bore, a hollow shank portion integral with said valve head and extending axially therefrom, a pin anchored in said hollow shank portion, a spring compressed between said washer and said valve head surrounding said pin in said intermediate bore and surrounding said hollow shank portion for urging the sealing ring against the valve seat, and an end portion on said pin beyond said washer bent relative to the main portion of the pin for riding on the inclined end of the body to compress the spring and open the valve by retraction of said resilient ring and said valve head completely beyond the juncture of said drain tube and said body to establish full communication therebetween as the pin is rotated relative to the body.

3. A fluid flow control valve comprising a hollow open-ended housing having an internal bore providing an internal valve seat at one end thereof, a valve head slidable in said housing bore and guided thereby for movement toward and away from said seat for coaction therewith, a drain tube anchored in said housing adjacent said seat for draining fluids from the housing when the valve head is removed from said seat, a hollow shank portion integral with said valve head and extending axially therefrom, a spring extending in surrounding relation to said hollow shank portion and engaging said valve head for urging the valve head against said seat, a sloping plane end wall on said housing at the other end of said bore, said sloping end wall being integral with said housing and a handle anchored in said hollow shank portion and arranged to ride on said sloping end wall of the housing to actuate the valve head toward and away from the valve seat in a single uninterrupted motion for opening and closing the valve, said valve head being actuatable to a closed position on one side of said drain tube against said valve seat and to an open position on the other side of said drain tube to accommodate completely free drainage therethrough.

RUSSELL R. CURTIS.

REFERENCES CITED

The following references are of record in the file of this patent:

UNITED STATES PATENTS

| Number | Name | Date |
| --- | --- | --- |
| 491,349 | Hardoin | Feb. 7, 1893 |
| 519,049 | Spofford | May 1, 1894 |
| 562,074 | Fowler | June 16, 1896 |
| 906,665 | Stevens | Dec. 15, 1908 |
| 1,250,237 | Snyder | Dec. 18, 1917 |
| 1,397,080 | Coleman | Nov. 15, 1921 |
| 1,441,784 | Clayton | Jan. 9, 1923 |
| 1,448,873 | Searles | Mar. 20, 1923 |
| 1,631,456 | Bardin | June 7, 1927 |
| 1,674,076 | Weatherhead | June 19, 1928 |
| 1,678,640 | Hall | July 31, 1928 |
| 1,681,981 | Gilbert | Aug. 28, 1928 |
| 1,705,404 | Hedberg | Mar. 12, 1929 |
| 1,773,924 | Merrill | Aug. 26, 1930 |
| 1,887,677 | Gamble | Nov. 15, 1932 |
| 1,964,835 | Wheaton | July 3, 1934 |
| 2,049,663 | Rice | Aug. 4, 1936 |
| 2,571,356 | Gates | Oct. 16, 1951 |

FOREIGN PATENTS

| Number | Country | Date |
| --- | --- | --- |
| 849,048 | France | of 1939 |